United States Patent [19]

Batch

[11] 3,863,935

[45] Feb. 4, 1975

[54] SEAL ASSEMBLY AND LUBRICATION SYSTEM IN A PUMP FOR HANDLING LIQUID MATERIALS

[76] Inventor: Marvin L. Batch, 2106 Wilmington, Midland, Mich. 48640

[22] Filed: Jan. 9, 1974

[21] Appl. No.: 431,897

[52] U.S. Cl. .......................... 277/65, 277/3, 277/17
[51] Int. Cl. ...... F16j 15/16, F16j 15/40, F16j 15/44
[58] Field of Search ...................... 277/3, 15, 17–21, 277/58, 59, 65, 38–44, 81

[56] References Cited
UNITED STATES PATENTS

| | | | |
|---|---|---|---|
| 1,768,606 | 7/1930 | Keilholtz et al. | 277/65 |
| 2,653,833 | 9/1953 | Barron | 277/65 |
| 2,886,349 | 5/1959 | Porges | 277/65 |
| 3,333,856 | 8/1967 | Voitik | 277/65 |
| 3,362,718 | 1/1968 | Little | 277/65 |
| 3,467,396 | 9/1969 | Hershey | 277/65 |
| 3,743,302 | 7/1973 | Bach | 277/65 |

Primary Examiner—Richard E. Aegerter
Assistant Examiner—Robert I. Smith
Attorney, Agent, or Firm—V. Dean Clausen; John M. DeMeester

[57] ABSTRACT

A seal assembly and lubrication system is disclosed which is particularly suitable for use in a pump for handling liquid materials. The pump is a conventional type which includes a rotatable shaft positioned in a packing gland chamber. At the rear of the packing gland chamber is a rear seal assembly in which the components enclose the shaft. A forward seal assembly, having components which also enclose the shaft, is positioned in the packing gland chamber ahead of the rear seal assembly and next to the pump head housing. A first space is defined between the rear seal assembly and forward seal assembly. This space communicates with a smaller space defined by clearance between a lubrication feeder member in the forward seal assembly and the shaft. The rear seal assembly includes a lubrication passage in communication with a seal face. During operation of the pump, the passage is adapted to carry an oil lubricant to the seal face. From the seal face the lubricant is carried into the smaller space next to the shaft. At the same time, the lubrication feeder member is adapted to deliver a grease lubricant into the smaller shaft space. The result is an in situ blending of the oil and grease lubricants in the smaller space, which aids lubrication of the shaft and resists product leakage into the packing gland chamber.

4 Claims, 2 Drawing Figures

SEAL ASSEMBLY AND LUBRICATION SYSTEM IN A PUMP FOR HANDLING LIQUID MATERIALS

BACKGROUND OF THE INVENTION

The invention relates broadly to a seal assembly. More specifically, the invention is directed to a seal assembly and lubrication system for use in a pump for handling liquid materials.

Various types of pumps are used in industry to pump liquids from one point to another. In chemical plants, for example, a centrifugal pump may be used to transfer a liquid from a holding tank to a process line. In one type of pump the liquid being transferred is drawn through an intake port in the pump head housing by an impeller which rotates within the housing. The impeller, which is fastened to one end of the rotating shaft, then pushes the liquid out of the pump head through a discharge port, which is usually positioned in the housing above the intake port.

The opposite end of the shaft is usually connected to a motor, as means for rotating the shaft. To prevent the product from leaking past the pump head housing, the shaft is enclosed by a seal assembly immediately adjacent to the pump head. In one type of seal asembly now in use, the shaft is enclosed by a conventional mechanical seal, together with packing material, which is housed in a packin gland chamber.

The present seal assemblies have certain drawbacks. The main problem is that the packing material becomes overheated from the friction drag caused by the rotating shaft. Constant overheating of the packing material causes it to burn, and eventually harden and break up. This allows the liquid product, which is usually pumped under pressure, to leak past the weakened packing and damage the seal face. In some instances the seal unit may be damaged badly enough to allow the product to leak out of the packing gland chamber. This can be undesirable if the liquid is highly corrosive or toxic to humans. Product leakage is also undesirable in that it represents waste.

Attempts to alleviate the problem have included various means of forcing a lubricant through the packing material and onto the shaft. Present lubrication systems for pump seals, however, have not been entirely successful. The seal assembly usually breaks down in a short time, so that frequent repair and replacement of parts is necessary.

SUMMARY OF THE INVENTION

Broadly, the invention is directed to a seal assembly and lubrication system suitable for conventional pumps for handling liquid materials. The pump includes a rotatable shaft housed in a packing gland chamber. One end of the packing gland chamber is defined by a gland ring. The opposite end of the chamber is defined by the pump head housing. A rear seal assembly, having components which enclose the shaft. is positioned next to the gland ring. Positioned adjacent to the pump head housing is a forward seal assembly which is spaced from the rear seal assembly. The space between the seal assemblies forms part of a smaller space defined by clearance between a lubrication feeder member in the forward seal assembly and the shaft. In the rear seal assembly is a lubrication passage which connects a lubrication port in the gland ring with a seal face. The lubrication feeder member forms a link between a lubrication port in the wall of the packing gland chamber and the smaller shaft space. In operation of the pump, an oil lubricant is carried onto the seal face and then into the smaller shaft space by the slinging action of the seal face. Simultaneously, the lubrication feeder member feeds a grease lubricant into the shaft space. As the two lubricants are mixed in the shaft space, an in situ blending of the lubricants is achieved.

DESCRIPTION OF A PREFERRED EMBODIMENT

Figure 1:
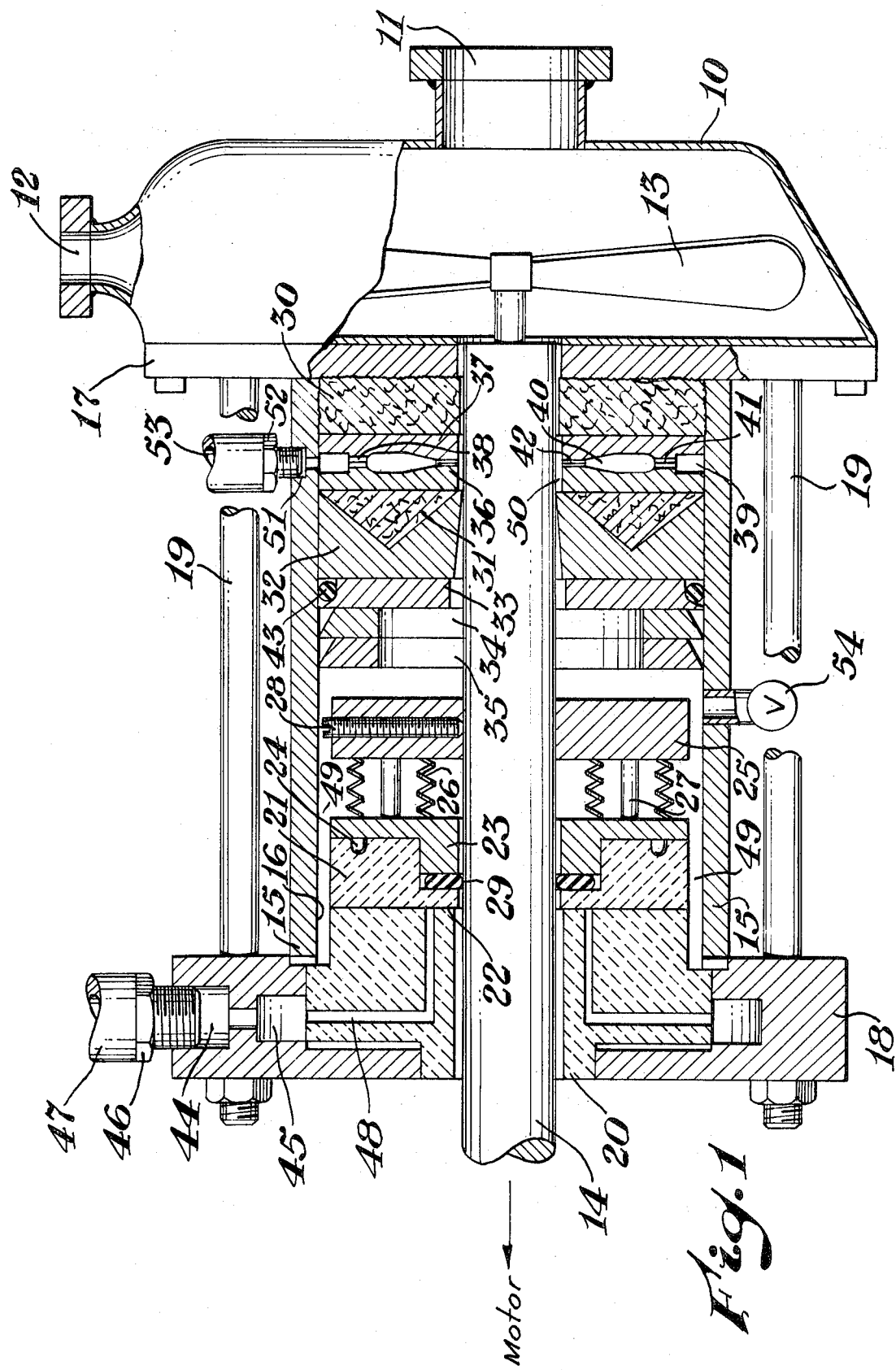
FIG. 1 is a side elevation view, mostly in section, of a preferred form of a seal assembly and lubrication system according to this invention. The seal assembly and lubrication system shown herein is installed on a pump for handling liquid materials.

Referring to the drawing, particularly FIG. 1, numeral 10 indicates a pump head housing which has a liquid intake port 11 and a liquid discharge port 12. Liquid drawn into head 10 through port 11 is pushed out of the head by an impeller 13, which is mounted on one end of a rotatable shaft 14. The opposite end of shaft 14, the driven end, is connected to a motor (not shown), or other suitable drive means.

The portion of shaft 14 immediately behind impeller 13 is enclosed by a packing gland chamber 15, which has an inner wall surface 16. A plate 17, which fastens into pump head 10, defines the forward or pump end of gland chamber 15. The rear end of chamber 15 is defined by a gland ring 18. Gland ring 18 is tied to plate 17 by threaded studs 19.

A conventional mechanical seal assembly encloses the shaft 14 at the rear end of packing gland chamber 15. In this description, the conventional seal assembly is referred to as the rear seal assembly. One part of the rear seal asembly comprises an insert block 20, which seats in gland ring 18. The insert block is usually fabricated of conventional materials such as carbon, bronze, and the like. A second part is a face block 21, which mates with insert block 20 to define a seal face 22. A third part of the seal assembly is a compression ring 23. Compression ring 23 is equipped with drive pins 24, which engage corresponding slots in face block 21.

A collar 25 comprises a fourth part of the seal. Positioned between compression ring 23 and collar 25 are several sets of spring members 26 and pin guides 27. Collar 25 is locked to shaft 14 by set screw 28, and pin guides 27 are fastened solidly into collar 25. During rotation of shaft 14, the insert block 20 remains stationary, i.e., it does not rotate with the shaft. The other components of the rear seal assembly, namely, face block 21, compression ring 23, and collar 25, comprise a rotating unit, which is designed to rotate with the shaft.

In the rotating unit the pin guides 27 function both as a drive pin and line-up pin. As a drive pin, they rotate compression ring 23 and face block 21. As a lineup pin, they keep springs 26 straight. In practice, the tension on springs 26 can be adjusted by loosening screw 28 and moving collar 25 either way on shaft 14. By adjusting tension on springs 26, the desired amount of pressure can be achieved on seal face 22. An O-ring 29 fits over shaft 14 and is sandwiched between mated shoulders of face block 21 and compression ring 23. The primary function of O-ring 29 is to prevent liquid product from leaking past the rear seal assembly into the stmosphere.

At the forward end of packing gland chamber 15, the shaft 14 is enclosed by a forward seal assembly. component parts of the forward seal assembly include a first packing ring 30, a second packing ring 31, an auxiliary packing ring 32, a retainer ring 33, a pair of locking rings 34, 35, and a lubrication feeder member. The lubrication feeder member is defined by a split ring comprising two symmetrical segments 36 and 37. As fitted around shaft 14, the segments 36 and 37 are mated at a common interface 38.

In operating position on shaft 14, the interface 38 of segments 36, 37 defines a conduit means for directing a lubricant onto the shaft 14. One part of the conduit is an outer continuous channel 39, which is defined at the periphery of interface 38. A second part of the conduit is defined by an inner continuous channel 40. A third part of the conduit comprises several openings 41. Openings 41 are spaced at various points around channel 39, and these openings connect channel 39 with channel 40.

A fourth part of the conduit comprises several smaller openings 42, which are spaced at various points around channel 40 and which are directly aligned with openings 41. Openings 42 connect channel 40 with the hub portion of the split ring feeder member. An O-ring 43 is fitted around the periphery of retainer ring 33.

In practice, the present pump seal assembly is adapted to provide a double lubrication system for the rotating shaft 14. The actual lubrication system provides for carrying both an oil lubricant and a grease lubricant to the shaft 14. This system gives added protection to the shaft, as described later in this text.

The oil lubrication system is incorporated primarily in the rear seal assembly. Referring to FIG. 1, the upper edge of gland ring 18 includes a first lubrication receiving port 44. A first lubrication channel 45 is positioned below receivng port 44 and is defined at the inner shoulder of gland ring 18. A small opening connects receiving port 44 with lubrication channel 45. A fitting 46 and line 47 provide means for directing the oil lubricant into receiving port 44.

A series of first lubrication passages 48 extend through insert block 20. Each passage 48 comprises a vertical branch which communicates with lubrication channel 45 and a horizontal branch which extends to the seal face 22. A small elongate space 49 is defined between the outer edges of the component parts of the rear seal assembly and the inner wall surface 16 of packing gland chamber 15. Space 49 also includes the opening defined between collar 25 and locking ring 35. A second space 50 is defined between the inner diameter of the component parts of the forward seal assembly and shaft 14.

The grease lubrication system is incorporated primarily into the forward seal assembly. Referring again to FIG. 1, a second lubrication receiving port 51 is positioned in the upper wall of packing gland chamber 15. A grease lubricant is directed into lubrication receiving port 51 through a fitting 52 and lubrication line 53. Lubrication receiving port 51 communicates directly with a second lubrication channel, as provided by the outer continuous channel 39 in the split ring feeder member. From outer channel 39, the grease lubricant feeds into the space 50 through a series of second lubrication passages. The second lubrication passages are defined by the conduit means of the split ring feeder member. Specifically, these passages are made up of openings 41, inner channel 40 and openings 42.

A typical operation of the pump seal assembly will now be described. The broad objectives of this invention are to provide adequate lubrication to the rotating shaft and to prevent the liquid product from leaking into the packing gland 15. During operation of the pump, the liquid being drawn through the pump head will exert a certain pressure, which is either inwardly or outwardly. Inward pressure tends to force the liquid product along the rotating shaft and into the seal assembly area in packing gland chamber 15. Outward pressure tends to draw the lubrication material away from the shaft and into pump head 10.

After start up of the pump, both the oil lubricant and the grease lubricant are directed into the packing gland chamber 15 simultaneously and at a given flow rate and pressure. The oil lubricant is fed through line 47 and fitting 46 into receiving port 44. From port 44 the oil feeds through lubrication channel 45 and lubrication pasage 48 and onto the seal face 22. At seal face 22 the oil is picked up by the rotating face block 21 and is propelled into space 49 by the resulting slinging action of the face block.

The grease lubricant is fed through line 53 and fitting 52 into receiving port 51. From port 51, the grease feeds through channel 39, openings 41, channel 40, and openings 42 and into space 50. As the shaft rotates, the oil in space 49 will gradually fill this space and be forced on into space 50. In space 50, therefore, the oil and grease will mix so that there is an in situ blending of the lubricants. The actual point at which the two lubricants begin to mix and blend together will depend primarily on the inward or outward pressure exerted along the rotating shaft and the individual pressure and flow rate exerted by the lubricants.

During the lubrication operation, O-ring 43 has the important function of an auxiliary seal. Specifically, it prevents the oil lubricant from bypassing the desired direct flow path from space 49 into space 50. Also, it will be noted that the outer edges of locking rings 34 and 35 have a chisel edge. These sharpened edges help to prevent the components of the forward seal assembly from slipping in the packing gland chamber.

Various conventional means may be used to control the flow rate and pressure on the lubricants as they are fed into the packing gland chamber 15. In the practice of this invention, a preferred lubricant feed means comprises a cycling timer (not shown) and a microflow pump unit (not shown). The timer is set at a predetermined interval, for example, from every 30 seconds to once a week. Oil is pumped through the line 47 by one microflow pump unit.

A second microflow pump unit pumps grease through line 53. The timer operates a solenoid unit (not shown), and the solenoid, in turn, operates each pump unit. It is preferred to install a check valve 54 in the wall of packing gland chamber 15. The check valve enables the operator to "bleed off" any excess pressure build up in the packing gland chamber.

Various commercially available oils and greases may be used in the practice of this invention. The choice of oil and/or grease to be used will depend on several factors. One factor is compatibility of the particular oil and the grease which are used within the same seal assembly. In other words, the lubricants themselves must be compatible with each other when used in the same seal assembly. Another factor is compatibility of each lubricant with the component parts of the seal assembly. A third factor is the actual chemical and physical properties of each lubricant, which enable it to adequately lubricate the rotating shaft and, at the same time, prevent product loss.

The properties to be considered, for example, are the viscosity of the lubricant at different temperatures, the density, the thermal expansion factor, the flash point, the pour point, and the fire point. Examples of suitable lubricants which may be used are the commercially available silicone-based oils and greases, such as those manufactured by Dow Corning Corporation.

Figure 2:
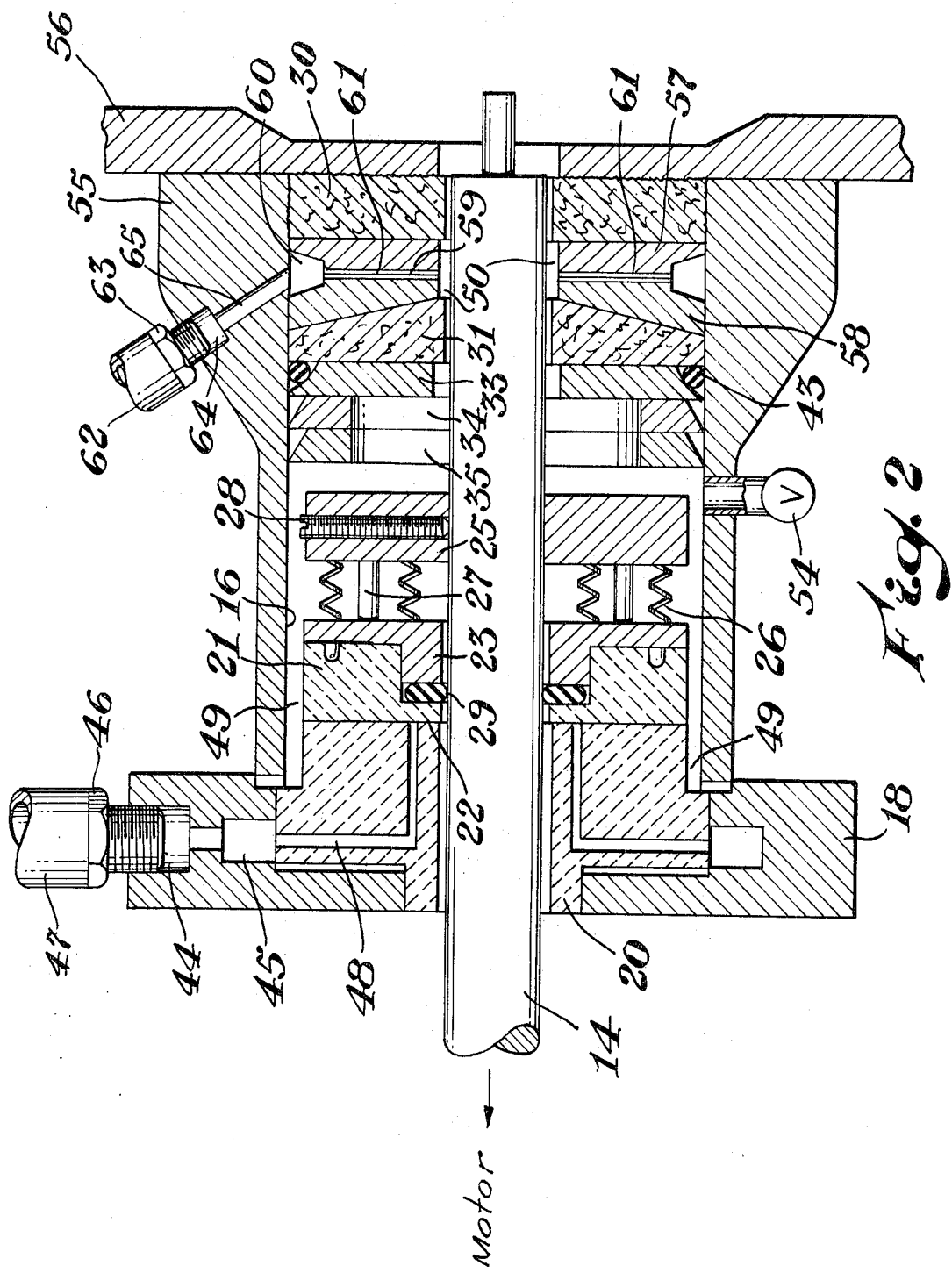
FIG. 2 is a side elevation view, mostly in section, of a second seal assembly and lubrication system for a pump, which is a modified form of the unit shown in FIG. 1.

FIG. 2 illustrates a modified form of the seal assembly and lubrication system shown in FIG. 1. The structure and operation of the system illustrated in FIG. 2 is essentially the same as that shown in FIG. 1. A primary difference in the two systems is found in the grease lubrication system of the forward seal assembly. In addition, the seal assembly of the FIG. 2 embodiment is designed for use in a pump in which the packing gland chamber is more compact (shorter in length) than that shown in FIG. 1.

In FIG. 2 the same numerals are used to designate those parts which are identical with the parts shown in FIG. 1. Conversely, different numbers are used in FIG. 2 to indicate parts which have a different structure or function than the parts shown in the assembly of FIG. 1. Referring to FIG. 2, the shaft 14 is enclosed by a packing gland chamber 55. The forward end of gland 55 fastens into a plate 56, which defines part of the pump head (not shown).

An impeller (not shown), which rotates in the pump head is fastened to the forward end of shaft 14. In the foward seal assembly, a lubrication feeder member is positioned between the first packing ring 30 and the second packing ring 31. The lubrication feeder member is defined by a split ring which comprises two segments 57, 58, which are mated at a common interface 59.

Segments 57 and 58 are not symmetrical, even though they are mated at common interface 59. As shown in FIG. 2, the outer wall of segment 57 is vertical, but the outer wall of segment 58 tapers upwardly. When the lubrication feeder member is positioned around shaft 14, the interface 59 defines a conduit for directing a grease lubricant onto the shaft 14.

One part of the conduit is an outer continuous channel 60, which has upwardly tapered walls. Channel 60 is defined at the periphery of interface 59. A second part of the conduit is defined by several elongate openings 61, which provide lubrication passages. The openings 61 are spaced at points around channel 60, and these openings connect channel 60 with the hub portion of the split ring feeder member.

In the unit of FIG. 2, the grease lubricant is directed into the forward seal assembly through a line 62 and fitting 63 and into a lubrication receivng port 64. From receiving port 64, the grease passes through a connecting channel 65, into outer channel 60 and on into the lubrication passages 61.

The seal assemblies of this invention have certain advantages not found in prior seal assemblies. Referring to FIG. 1, the auxiliary packing ring 32 is a V-shaped ring, which is fabricated of a suitably flexible material, such as a Teflon resin. The split rings 36 and 37, which comprise the lubrication feeder member, are preferably constructed of a metal alloy, such as steel.

During operation, the pump head pressure may develop sufficiently to reverse the flow of lubricant from shaft 14 back into the feeder member. In this situation the rings 36 and 37 will expand outwardly and put pressure on ring 32. This pressure causes ring 32 to expand and seal tightly against inner wall 16 of the packing gland chamber and shaft 14. The resulting restriction prevents product back flow into space 49. If the pump head generates a vacuum condition, the reverse pressure will relax ring 32 and allow the lubricant to move along shaft 14 toward housing 10.

In the embodiment of FIG. 2, the rings 30 and 31 are preferably fabricated of a conventional packing material. Split rings 57 and 58, which comprise the lubrication feeder member, are preferably constructed of steel, or other suitable metal alloys. In this seal assembly, any back flow of lubricant into the feeder member will cause the rings 57 and 58 to expand outwardly, in the same manner as the feeder member of FIG. 1. However, when pressure is applied to ring 31 in this seal construction, the greater part of the force is directed toward shaft 14.

What is claimed is:

1. An improved seal assembly and lubrication system for use in a pump for handling liquid materials, the pump including a rotatable shaft positioned in a packing gland chamber which has an inner wall surface, the improvement comprising the combination of:

a gland ring which defines one end of the chamber;

a pump head housing which defines the opposite end of the packing gland chamber;

a first lubrication receiving port which is positioned in the gland ring, and is adapted for receiving a lubrication material;

a first lubrication channel which is defined in the gland ring, which communicates with the first lubrication port, and which is adapted to receive the said lubricant material from the first lubrication port;

a rear seal assembly in which the components enclose the shaft, the components are spaced from the inner wall surface of the packing gland, the components include an insert block that seats in the gland ring and a face block that mates with the insert block to define a seal face;

a series of first lubrication passages which extend through the insert block, which connect the first lubrication channel with the seal face, and which are adapted to carry the said lubricant material from the first lubrication channel to the seal face;

a forward seal assembly in which the components enclose the rotatable shaft, the components are spaced from the rear seal assembly and from the shaft, the components are positioned adjacent to the pump head housing, and one component of the seal assembly is a lubrication feeder member;

a second lubrication receiving port which is positioned in the wall of the packing gland chamber, and is adapted for receiving a lubrication material;

a second lubrication channel which is defined in the lubrication feeder member, which communicates with the second lubrication receiving port, and which is adapted to receive the said lubricant material from the second lubrication port;

a series of second lubrication passages which are defined in the lubrication feeder member, which connect the second lubrication channel with the space defined between the forward seal assembly and the shaft, and which are adapted to carry the said lubricant material from the second lubrication channel to the shaft.

2. The seal assembly and lubrication system of claim 1 in which the rear seal assembly is adapted to carry an oil lubricant from the first lubrication receiving port into the space defined between the forward seal assembly and the shaft, and the forward seal assembly is adapted to carry a grease lubricant from the second lubrication receiving port into the space defined between the forward seal assembly and the shaft.

3. The seal assembly and lubrication system of claim 1 in which the lubrication feeder member of the forward seal assembly is defined by a split ring, the ring comprising two symmetrical segments which have a mating interface, the segment interface defining a continuous peripheral channel for receiving a lubricant material from the second lubrication receiving port, a hub for enclosing the rotatable shaft, and a series of lubrication passages which are spaced at points around the peripheral channel, and which connect the peripheral channel with the hub.

4. The seal assembly and lubrication system of claim 1 in which the lubrication feeder member of the forward seal assembly is defined by a split ring, the ring comprising two segments which have a mating interface, the segment interface defining a continuous peripheral channel for receiving a lubricant material from the second lubrication receiving port, a hub for enclosing the rotatable shaft, and a series of lubrication passages which are spaced at points around the peripheral channel, and which connect the peripheral channel with the hub.

* * * * *